United States Patent [19]

Haddon et al.

[11] Patent Number: 5,391,323
[45] Date of Patent: Feb. 21, 1995

[54] CONDUCTIVITY IN CARBONACEOUS COMPOUNDS AND DEVICES USING SUCH COMPOUNDS

[75] Inventors: Robert C. Haddon, Dover; Arthur F. Hebard, Bernardsville; Donald W. Murphy, Green Brook; Matthew J. Rosseinsky, Piscataway, all of N.J.

[73] Assignee: AT&T Corp., Murray Hill, N.J.

[21] Appl. No.: 156,664

[22] Filed: Nov. 22, 1993

Related U.S. Application Data

[63] Continuation of Ser. No. 671,275, Mar. 18, 1991, abandoned.

[51] Int. Cl.⁶ .................. C01B 31/00; H01B 1/04
[52] U.S. Cl. .................... 252/502; 252/503; 423/445 B; 423/DIG. 39; 423/DIG. 40; 505/100; 505/800; 257/613; 257/798
[58] Field of Search ............. 423/445 B; 252/500, 252/502, 503, 512; 257/613, 798; 505/1

[56] References Cited

U.S. PATENT DOCUMENTS

| | | | |
|---|---|---|---|
| 4,673,589 | 1/1987 | Standley | 252/502 |
| 5,035,835 | 7/1991 | Asakawa et al. | 252/512 |

OTHER PUBLICATIONS

Kratschmer et al, "Solid C₆₀: A New Form of Carbon," *Nature*, vol. 347, Sep. 27, 1990 pp. 354–358.
*Webster's II New Riverside Dictionary*, The Riverside Publishing Co. (1984), p. 762.
Hawkins et al, *Journal of Organic Chemistry*, vol. 55, pp. 6250–6252 (1990).
Heath et al., *Journal of American Chemical Society*, vol. 107, pp. 7779–7780 (1985).
Haddon et al *Nature*, vol. 350 pp. 320–322, Mar. 28, 1991.
Cox et al, *Journal of Chemical Physics*, vol. 88, No. 3 pp. 1588–1595.
Kroto, H. W. et al, *Nature*, 318, 162 (1985).
Kratschmer, W. et al, *Nature*, 347, 354 (1990).
Wudl, F., *Materials Research Society Meeting*, Nov. 29, 1990, Boston, Mass.
Allemand, P.-M. et al, *J. Am. Chem. Soc.*, 113, 2780–2781 (1991).
Haddon, R. C., *Nature*, 350, 46 (1991).
Haddon, R. C., *Phys. Rev. B.*, 43, 2642 (1991).

*Primary Examiner*—Michael Lewis
*Assistant Examiner*—Stephen G. Kalinchak
*Attorney, Agent, or Firm*—Bruce S. Schneider

[57] ABSTRACT

Carbonaceous materials based on the fullerene molecules have been developed which allow for high conductivity (comparable to or higher than those attained by n-type doped polyacetylene). The fullerene materials are soluble in common solvents.

10 Claims, 1 Drawing Sheet

CONDUCTIVITY IN CARBONACEOUS COMPOUNDS AND DEVICES USING SUCH COMPOUNDS

This application is a continuation of application Ser. No. 07/671,275, filed on Mar. 18, 1991, now abandoned.

BACKGROUND OF THE INVENTION

1. Field of the Invention

This invention relates to conductive compounds and, in particular, carbonaceous conductive compounds.

2. Art Background

Recently there has been significant interest in organic materials that are either conductive or that can be doped to produce conductivity. Such organic materials have been suggested for a wide variety of uses that depend on their conductivity. For example, organic materials are generally easily formed in thin films as conductive components in devices such as switches, antistatic devices or magnetic shielding.

The classic carbon-based conductors are graphite and polyacetylene. (Graphite is characterized by an infinite sheet-like structure of the element carbon.) Graphitic materials typically have conductivities in the range $10^3$ to $10^5$ Siemens/cm, but are intractable and therefore for some applications do not lend themselves to fabrication of the desired devices. Polyacetylene when doped has conductivities as high as $10^4$ Siemens/cm, but can be processed only during its preparation. Other organic conductors, such as those based on tetrathiafulvalene, have high conductivities ($10^3$ Siemens/cm), but again are difficult to form into desired geometries. (See, for example, U.S. Pat. No. 4,249,013 dated Feb. 3, 1981.)

A class of nascent organic materials are those based on fullerenes. Such materials are prepared by an electronic discharge process as described in Kroto, H. W. et. al., *Nature* 318, 162 (1985) and Kratschmer, W. et. al., *Nature* 347, 354 (1990). These materials, as reported, are insulators. Attempts have been made to modify these materials to improve their conductivity. For example, as reported by Wudl, F. at the *Materials Research Society Meeting*, Nov. 29, 1990, Boston, Mass., a tetraphenylphosphonium salt of fullerene has been made, but exhibited a conductivity no greater than $10^{-5}$ Siemens/cm. Generally for most applications, conductivities greater than $10^{-4}$ Siemens/cm, preferably greater than $10^{-3}$ Siemens/cm, most preferably greater than 0.1 Siemens/cm, are desired.

Thus, although a substantial body of research has been directed to tractable carbonaceous compounds having reasonable conductivities, such research has not been entirely successful.

SUMMARY OF THE INVENTION

Highly conducting tractable materials (conductivities as large as 500 Siemens/cm at room temperature) have been made by electronic structure modification of fullerenes. In particular, compounds consisting essentially of carbon where essentially all the carbons are bound to three other carbons and where this carbon framework forms a finite polyhedron yield acceptable conductivities through, for example, the addition of electrons to the compound by doping. In one exemplary embodiment, a fullerene having 60 carbon atoms is deposited in a thin film and subjected to vapor phase alkali metals, e.g., lithium, sodium, potassium, rubidium or cesium. The resulting materials have conductivities in the range of 1 to 500 Siemens/cm at room temperature. It is possible to form the fullerene into desired shapes before doping either by solution or vapor phase deposition. The conductivity of these materials in the exemplary embodiments are sensitive to water vapor. When used in a conductive link, this loss of conductivity and concomitant decrease in current upon exposure to such water affords a sensor for water vapor.

BRIEF DESCRIPTION OF THE DRAWING(S)

The Figure is illustrative of an apparatus suitable for producing conductive carbonaceous materials of the invention.

DETAILED DESCRIPTION

Figure 1:
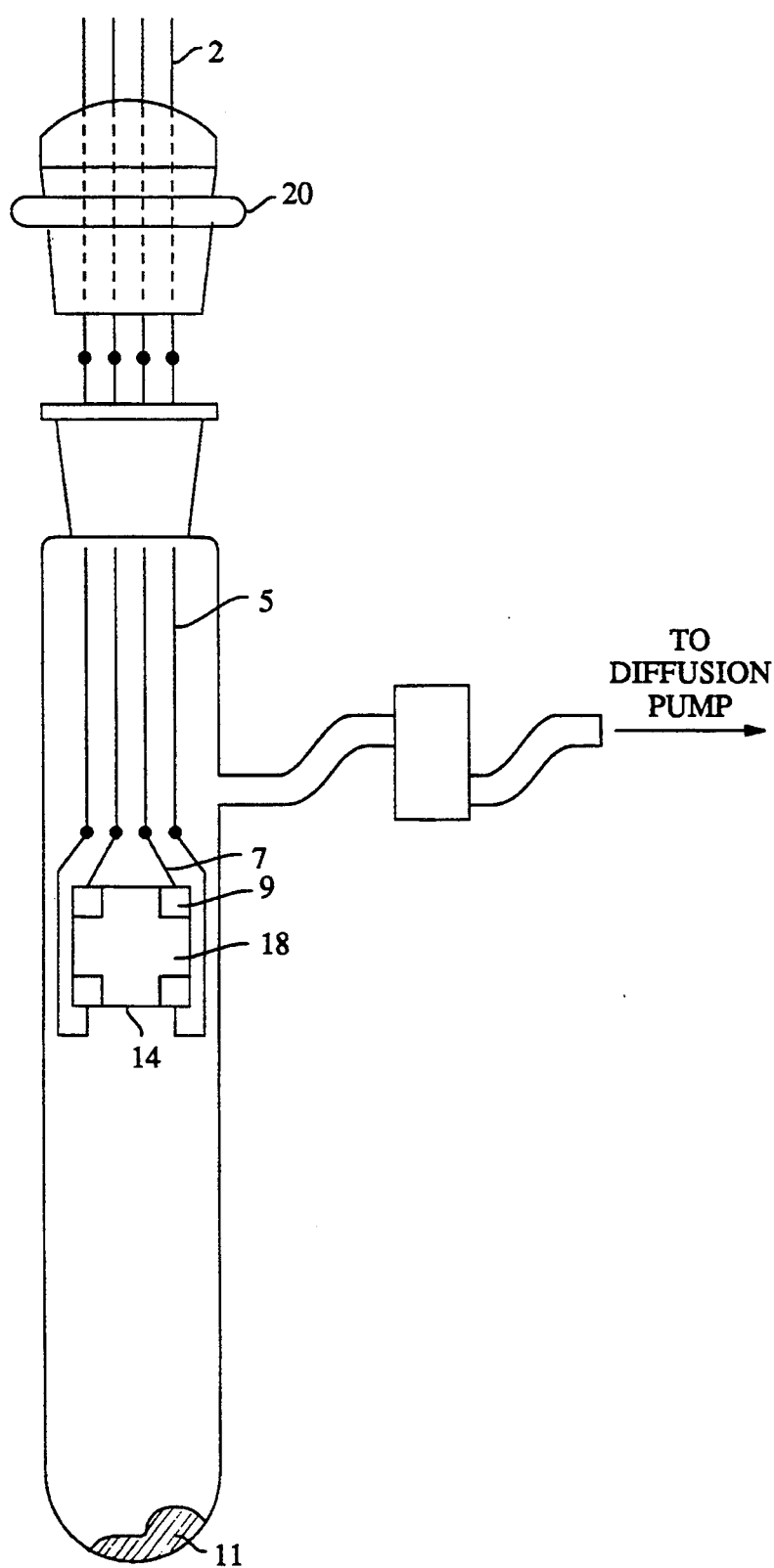

As discussed, the invention involves conductive fullerenes, i.e., fullerenes that have a conductivity greater than $10^{-4}$ Siemens/cm, preferably greater than $10^{-3}$ Siemens/cm, most preferably greater than 0.1 Siemens/cm. These fullerenes are molecular compounds characterized by 1) a network including essentially only carbon atoms, 2) where essentially all these carbons are bound to only three other carbons, and 3) where these carbons are spatially distributed in the molecule so that each carbon constitutes a vertex of a finite polyhedron. The invention also includes fullerenes, as defined above, where no more than 10% of the carbon atoms are modified by 1) addition of a substituent, 2) replacement with a different atom other than carbon, or 3) absence from the carbon skeleton.

In an exemplary embodiment these fullerenes, as defined above, are made conductive by addition or removal of electrons, i.e., by electronic modulation. In one embodiment, electrons are added to the fullerene structure by charge transfer from a species more electropositive than the fullerene. For example, it is possible to electronically modulate a fullerene by subjecting it to an alkali metal vapor. Alkali materials, such as sodium, potassium, rubidium and cesium, are significantly more electropositive than fullerene and therefore donate electrons to the fullerene structure. It is believed that the alkali metal is spatially located outside the fullerene carbon net and electronically interacts from that position. However, electron modulation by spatial location within the fullerene polyhedron, by coordination, or by direct chemical bonding is not precluded.

The conductivity of the fullerene depends on the amount of electronic modulator present. For example, with $C_{60}$, as electronic modulator is introduced the material becomes more and more conductive until conductivities of 10, 20, 500, 100, and 4 Siemens/cm, respectively, for lithium, sodium, potassium, rubidium and cesium electronic modulators, are reached. Addition of further electronic modulator leads to a decrease in conductivity. A contemplated explanation for this behavior is that initial introduction of electronic modulator partially fills the conduction band of the fullerene leading to higher conductivity. However, as greater concentrations of electronic modulator are introduced, the conduction band becomes full and electron conductivity is precluded. Although not all fullerenes necessarily behave in this manner, a suitable concentration for an electron modulator to yield a conductive material is easily determined using a series of controlled samples. Exemplary of concentrations useful to produce a conductive material in fullerenes are use of alkali materials having a modulator to $C_{60}$ mole ratio in the range 1 to 20%. Use of relatively large electronic modulators such as cesium, although not precluded, is not preferred. For example, thin films of $C_{60}$ exhibit spalling on modulation with cesium.

For some materials, such as $C_{60}$, the presence of an alkali metal electron modulator not only produces conductivity but produces a sensitivity of this conductivity to water. Introduction of water generally reduces the conductivity. Thus, such materials are useful as detectors for the presence of water vapor. A current is introduced through the conducting fullerene and the current flow noted. A decrease in current flow indicates an increasing presence of water vapor.

The following examples are illustrative of embodiments of the invention.

EXAMPLE 1

Approximately 10 mg of $C_{60}$ fullerene, produced as described by Kratschmer, *Nature*, 347, 354 (1990) and then purified by column chromatography as described by Haddon, *Nature*, 350, 46 (1991), was placed in an alumina crucible. The crucible environment was evacuated to a pressure of approximately $1.5 \times 10^{-6}$ Torr and the material was heated to a temperature of approximately 300° C. The use of a 300° C. sublimation produced a $C_{60}$ film. Under these conditions evaporation onto a glass slide was induced at a deposition rate of approximately 40 Å/min. The deposition was continued until a thickness of approximately 100–1000 Å was achieved. (Before deposition, the glass slide was coated with strips of evaporation deposited silver metal having a depth of approximately 1,000 Å and a spacing of approximately 1 cm.) Five millimeter in diameter silver wires were attached to the silver strips with silver epoxy and cured at 200° C. for one hour.

EXAMPLE 2

The procedure of Example 1 was followed, except $C_{70}$, prepared in accordance with Kratschmer *supra* and Haddon *supra*, was evaporated onto the silver coated glass slide at a temperature of approximately 400° C. to produce a $C_{70}$ film.

EXAMPLE 3

The fullerene coated slide prepared as in Example 1 with a thickness of 810 Å was placed at 14 in the apparatus represented in the Figure. (The films before further processing had a conductivity of less than $10^{-5}$ Siemens/cm.) Approximately 1 g of cesium metal was loaded at 11 into the apparatus in a dry box. The apparatus was then evacuated to a pressure measured at the pump of approximately $10^{-5}$ Torr.

The apparatus was immersed in an oil bath and the temperature of this oil bath was raised at a rate of approximately 5° C./hr. until 40° C. was reached. This temperature was maintained for approximately 1 hour. After this time period, the conductivity as measured at room temperature by probes 9 (silver strips) connected through leads 7, 5 and 2 through the apparatus and cap 20 was approximately $2 \times 10^{-4}$ Siemens/cm. Continued heating caused the conductivity to increase to a maximum of 4 Siemens/cm after an additional 90 minutes and then decline after a further hour to approximately 0.06 Siemens/cm.

EXAMPLE 4

A fullerene film of 388 Å thickness was prepared by the procedure of Example 1, modulated as in Example 3, except with rubidium metal and loaded into the apparatus. A load of 1 g and a bath temperature of 120° C. led to an observed conductivity maximum of 100 Siemens/cm and a subsequent decrease to less than $10^{-5}$ Siemens/cm after 2 hours heating.

EXAMPLE 5

The procedure of Example 4 was followed except the film thickness was 840 Å and 1 g of sodium metal was used at a bath temperature of 180° C. leading to a maximum conductivity of 20 Siemens/cm. After a further three hours, the conductivity fell to 0.4 Siemens/cm.

EXAMPLE 6

The procedure of Example 4 was followed except the film thickness was 840 Å and 1 g of potassium metal was used at a bath temperature of 130° C. leading to a maximum conductivity of 500 Siemens/cm. After a further four hours, the conductivity decreased to less than $10^{-5}$ Siemens/cm.

EXAMPLE 7

A fullerene film prepared by the procedure of Example 2 (150 Å film thickness) and modulated as in Example 3 was employed, except 1 g of potassium metal was loaded into the apparatus. After one hour at 120° C. the conductivity reached 2 Siemens/cm and after two further hours fell to 0.02 Siemens/cm.

EXAMPLE 8

The product of Example 5 was exposed to the atmosphere and its conductivity fell from 5 Siemens/cm to less than $10^{-5}$ Siemens/cm within 30 seconds.

EXAMPLE 9

Solid $C_{60}$ (0.5 mg) was placed in a sealed quartz capillary of diameter 1 mm and length 2 cm, and this was loaded into a 4 mm diameter ESR tube with a 3/8" glass termination. The sample tube was then transferred to a dry box. On top of the fullerene containing tube, in the ESR tube was then placed an open-ended capillary of diameter 1 mm, length 2 cm, containing 1 cm of solid potassium. The ESR tube was then connected to an Ultra-Torr ® fitting, with vacuum stopcock and o-ting termination. The closed apparatus was removed from the dry box, connected to a vacuum line and evacuated to $1 \times 10^{-3}$ Torr, and the ESR tube sealed with a torch, to give an ESR tube of length 24 cm. The whole tube was placed in an oven and subjected to a series of heat treatments up to 220° C. over a two day period, and then placed in a gradient tube furnace for 16 hours with the potassium capillary at 240° C. A darkened portion of the tube, away from the $C_{60}$, was heated with a torch over 5 minutes. After a few days a microwave-loss technique (Haddon, *Phys. Rev. B*" 43, 2642 (1991)), showed an absorption consistent with the onset of superconductivity at 18 K.

EXAMPLE 10

The procedure of Example 1 was followed, except 1 g of lithium metal was used, contained in a Kovar piece sealed to the Pyrex apparatus shown in the Figure, and the film thickness was 810 Å. The Kovar metal containing the lithium was warmed gently with a flame, producing an increase in conductivity within a minute, the conductivity rising to 10 Siemens/cm after four minutes then falling to less than 1 Siemens/cm after five minutes further heating.

EXAMPLE 11

29.5 mg of $C_{60}$ prepared according to Kratschmer, *supra*, purified according to Haddon et. al. *supra*, and dried at $160°/5\times10^{-6}$ Torr for 12 hours, were loaded into a 4 mm (5 cm long) outer diameter high purity quartz tube, in turn sealed to a 3/8" quartz tube (12 cm long). Approximately 16.33 mg cesium, contained in 5.24 cm of 0.457 mm internal diameter capillary tubing, was loaded in a dry box into the 3/8" quartz part of the apparatus to give a stoichiometry $Cs_3C_{60}$. The entire apparatus was evacuated to $8\times10^{-6}$ Torr, backfilled with $10^{-2}$ Torr helium gas then sealed 4 cm from the top of the 3/8" section. The cesium was gently distilled out of the capillary first using a flame, then by placing the cesium containing 3/8" section at 300° C. in a furnace with the $C_{60}$ containing 4 mm section at room temperature, for forty-eight hours. During this period, the cesium distilled into the narrow 4 mm section, reacting with the $C_{60}$ to produce a two-color (black on top, khaki on bottom) mixture. The tube was then sealed to produce a 5 cm long 3/8" section containing the reacted $C_{60}$ and remaining cesium: this tube was heated at 60° C. in a water bath for 24 hours. The magnetic susceptibility measured by the Faraday technique with a 14 KGauss field was temperature independent between 300° K. and 20° K., rising slightly below 20° K. then decreasing sharply below 12° K., consistent with metallic behavior down to 12° K. and the onset of superconductivity below this temperature.

We claim:

1. A solid phase fullerene having electrons added thereto by doping, said solid phase fullerene having a conductivity greater than $10^{-4}$ Siemens/cm.

2. The material of claim 1 wherein said conductivity is greater than $10^{-3}$ Siemens/cm.

3. The material of claim 1 wherein said conductivity is greater than 0.1 Siemens/cm.

4. The material of claim 1 wherein said dopant comprises an alkali metal.

5. The material of claim 4 wherein said alkali metal comprises a material chosen from the group consisting of lithium, cesium, sodium, potassium and rubidium.

6. A solid phase fullerene having an electronic structure modified through interaction with a dopant comprising an alkali metal, said solid phase fullerene having a conductivity greater than $10^{-4}$ Siemens/cm.

7. A solid phase fullerene according to claim 6 wherein the alkali metal is selected from lithium, cesium, sodium, potassium, and rubidium.

8. A device comprising a conducting region and electrical contacts to said conducting region wherein said conducting region comprises an electronic modulated fullerene material having a conductivity greater than $10^{-4}$ Siemens/cm.

9. The device of claim 8 wherein up to 10% of carbon atoms in the skeleton of said fullerene are modified.

10. The device of claim 8 wherein said electronic modulation comprises addition of electrons through intersection of said fullerene with an alkali metal.

* * * * *